June 28, 1955  R. R. BECKHAM  2,711,560
APPARATUS FOR DISTORTING PLASTIC SHEETS
Original Filed July 30, 1949  3 Sheets-Sheet 1
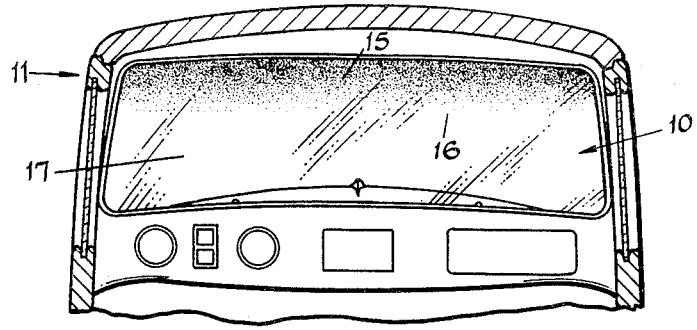
Fig. 1
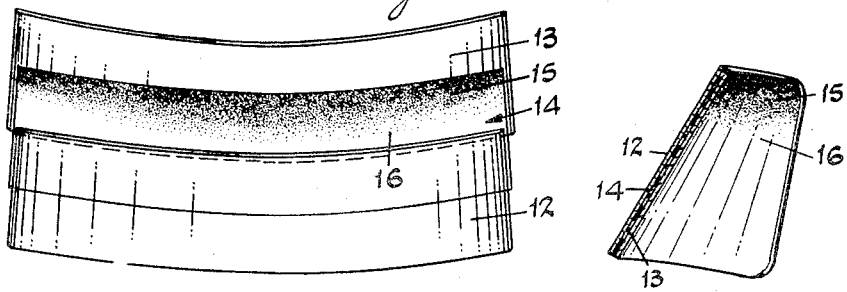
Fig. 3
Fig. 2
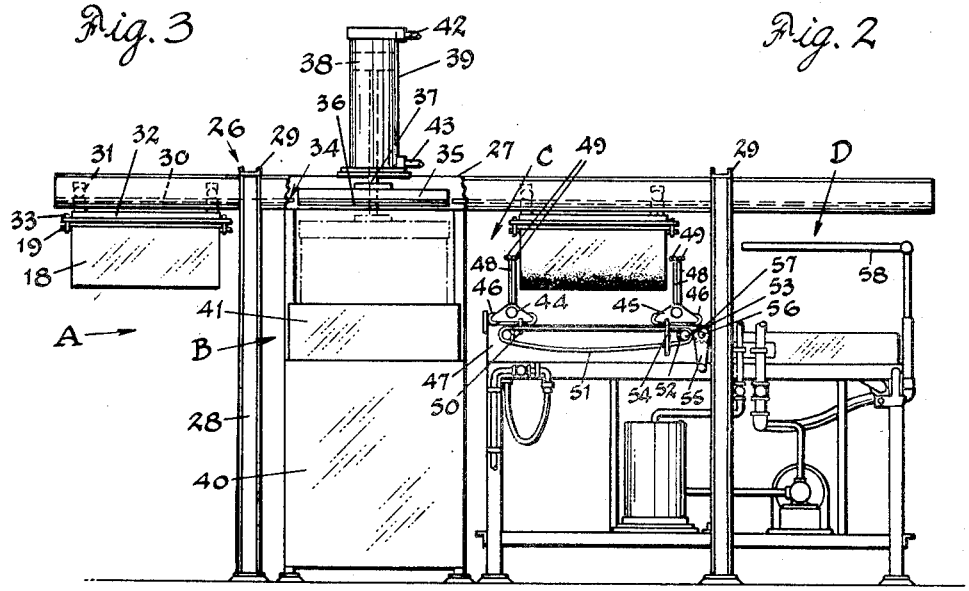
Fig. 4
Inventor
Robert R. Beckham
By Nobbe and Snope
Attorneys

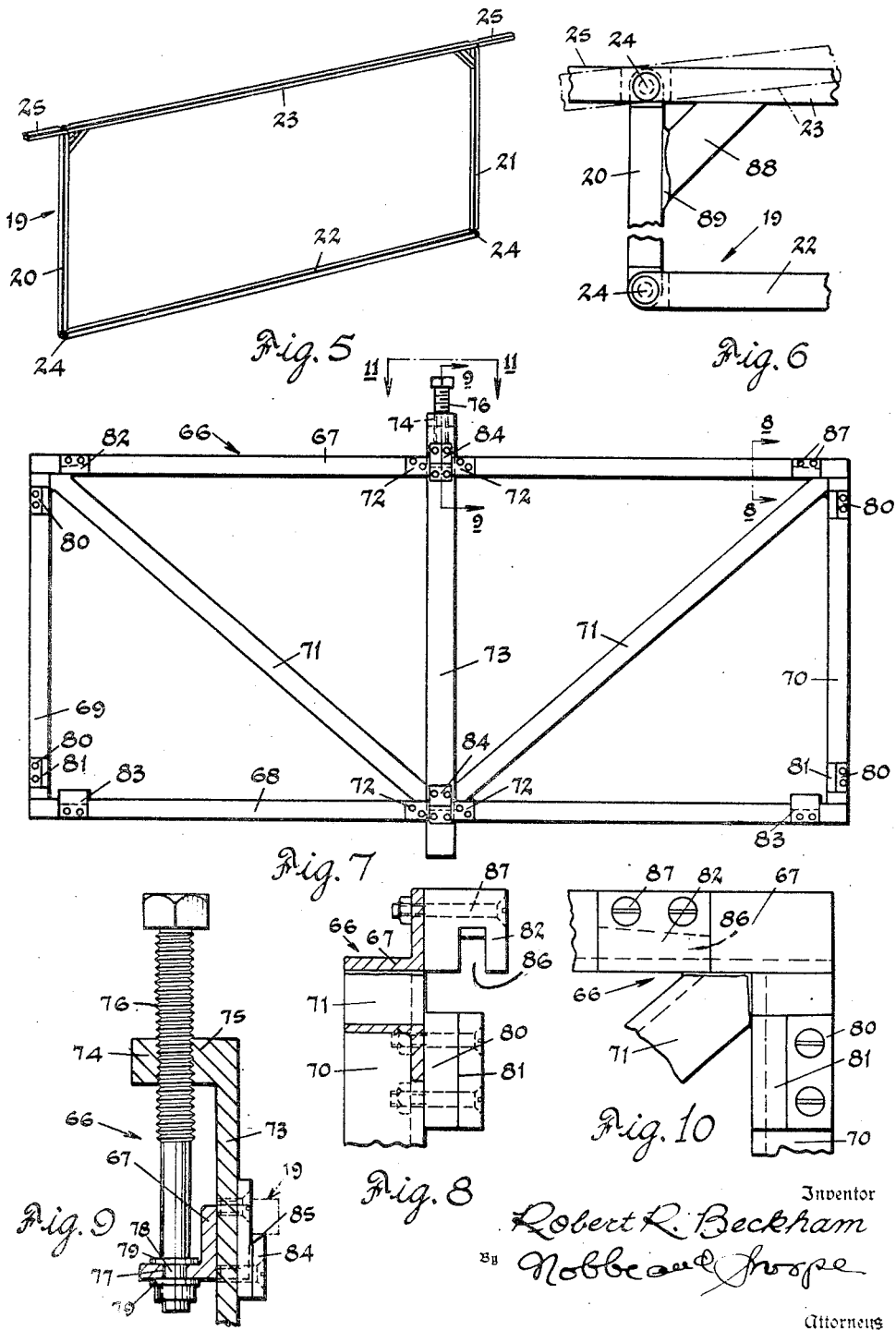

June 28, 1955   R. R. BECKHAM   2,711,560
APPARATUS FOR DISTORTING PLASTIC SHEETS
Original Filed July 30, 1949   3 Sheets-Sheet 3
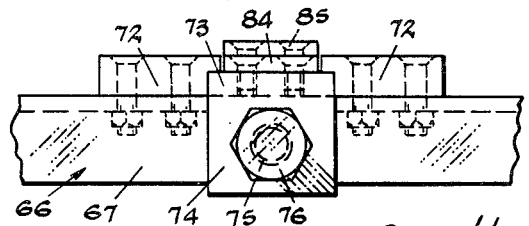
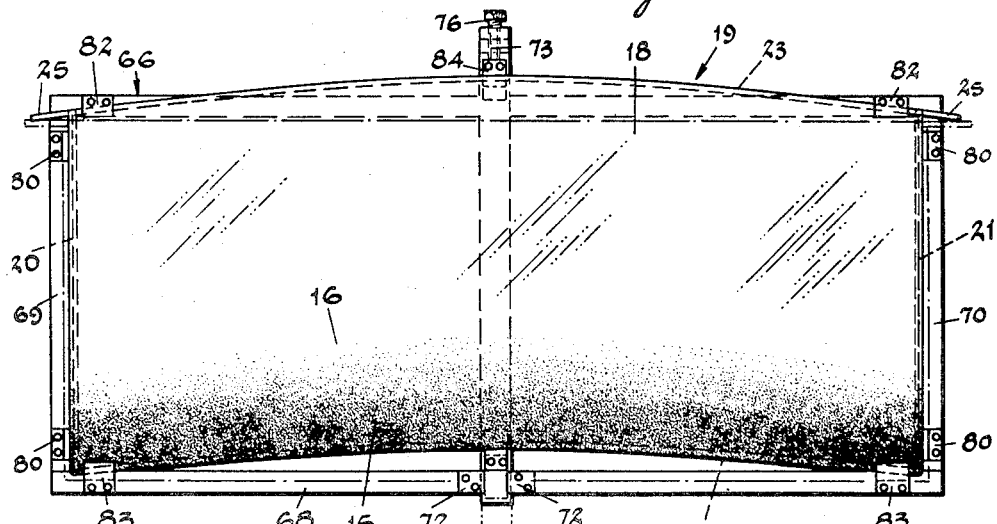
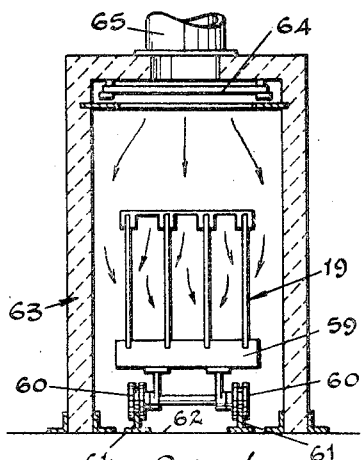
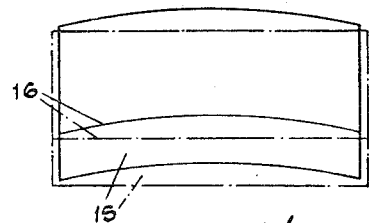
Inventor
Robert R. Beckham
By Nobbe and Swope
Attorneys

United States Patent Office 2,711,560
Patented June 28, 1955

2,711,560

APPARATUS FOR DISTORTING PLASTIC SHEETS

Robert R. Beckham, Toledo, Ohio, assignor to Libbey-Owens-Ford Glass Company, Toledo, Ohio, a corporation of Ohio Original application July 30, 1949, Serial No. 107,730, now Patent No. 2,593,405, dated April 22, 1952. Divided and this application October 30, 1951, Serial No. 253,899

5 Claims. (Cl. 18—19)

The present invention relates generally to the reduction of sun and sky glare, to a novel curved and angled, laminated glass window, windshield or the like that is provided with a built-in glare-reducing portion; and more particularly to an improved apparatus for use in producing such a device.

This application is a division of my co-pending application, Serial No. 107,730, filed July 30, 1949, now Patent No. 2,593,405.

The windshield with which this invention is primarily concerned is a specially curved and angled structure of the same general glare-reducing type as that disclosed in an application of Joseph D. Ryan and Paul T. Mattimoe, Serial No. 60,725, filed November 18, 1948, now Patent No. 2,636,420. Such windshields include a non-brittle plastic interlayer having an upper, colored or neutral shaded glare-reducing portion or band which is preferably of a shade graduated from relatively deep at the top to practical extinction at the bottom, laminated with one or more sheets of glass which have a relatively high luminous transmittance in the visible region of the spectrum, but which may have relatively low ultra-violet light transmittance.

The procedure for dyeing the plastic interlayer as disclosed in the Ryan-Mattimoe application, in which the plastic is dyed in the flat and then cut to size, has proved entirely satifactory for dyeing the glare-reducing portions of the interlayer for flat windshields, for most two-piece windshields, and for those that are curved in the vertical plan, but which have a very slight or no curve in the horizontal plane; and for these types of windshields such a dyeing procedure produces a straight horizontal cut-off line between the dyed and undyed areas when the windshield is mounted in an automobile. However, considerable difficulty is encountered in achieving a proper cut-off line when dyeing interlayers for bent windshields, and particularly for one-piece bent windshields, which have their principal bent curvature in the horizontal plane, which have an outline that is curved at the top and bottom and has diverging sides, and which are mounted in the automobile at an angle to the vertical.

When interlayers for this type of windshield are dyed in the flat, cut to the shape of the glass, sandwiched between the two pieces of bent glass and the laminated unit then mounted in an automobile, it is found that the cut-off line at the bottom of the dyed area will neither be straight nor horizontal. Instead, it will appear in the windshield as a line which curves rather sharply downward at the two opposite ends of the windshield, and this is unsatisfactory, first because the end curves run into the viewing area and, second, because it is undesirable in appearance.

It has been suggested that this difficulty be corrected by mounting the plastic interlayer in a frame, that is bent to the shape of the finished windshield, and then dipping it into the dye bath with the shaped frame held at the same angle as the windshield is to be mounted at in the car. However, this presents a number of practical difficulties when continuously dyeing a large number of plastic sheets in commercial production, and in satisfactorily rinsing the dyed sheets to insure a uniform, unstreaked, and properly graduated tinted or shaded area with a sufficiently imperceptible fade-off from the dyed to the undyed areas.

Now it is an aim of the present invention to overcome all of these difficulties and still provide an interlayer for windshields of the above shape and form, having a colored area whose cut-off line will appear to the observer to follow a straight, horizontal path.

Briefly stated, this is accomplished according to the invention by first dyeing or otherwise coloring the plastic sheet in the flat according to accepted procedures, and then distorting or shaping the flat colored plastic in such a manner that when it is incorporated into a windshield by laminating with two sheets of glass that are bent in the horizontal plane, and the composite structure then mounted at an angle in an automobile, the bottom or cut-off line of the dyed area of the plastic will appear as a straight, horizontal line to the driver and occupants of the car.

Another object is the provision of a novel apparatus for coloring, and then shaping or distorting the colored plastic to produce a plastic interlayer for a windshield of the above general character that will have a cut-off line of the desired shape and angularity.

Other objects and advantages of the invention will become more apparent during the course of the following description, when taken in connection with the accompanying drawings.

In the drawings, wherein like numerals are employed to designate like parts throughout the same:

Fig. 1 is an elevation of the windshield of the invention as viewed from the interior of an automobile in which it is installed;

Fig. 2 is a vertical sectional view through the windshield arranged in the angled position which it occupies in the automobile;

Fig. 3 is a perspective plan view of two sheets of glass and a dyed plastic interlayer prior to assembly into a sandwich and laminating into a finished windshield;

Fig. 4 is an elevation of one form of apparatus designed for dyeing and rinsing a plastic sheet that is to be shaped and cut into the shaded interlayer for the windshield;

Fig. 5 is a perspective view of the flexible dyeing frame for the plastic sheet;

Fig. 6 is an enlarged fragmentary view of one side of the dyeing frame, showing the hinged corners in detail;

Fig. 7 is an elevation of the shaping frame for distorting the flexible dyeing frame to shape or reshape the plastic sheet after dyeing;

Fig. 8 is a section taken substantially on the line 8—8 in Fig. 7;

Fig. 9 is a section taken substantially along the line 9—9 in Fig. 7;

Fig. 10 is an enlarged, fragmentary view of one corner of the shaping frame;

Fig. 11 is a fragmentary plan view taken substantially along the line 11—11 in Fig. 7;

Fig. 12 is an elevation showing the flexible dyeing frame mounted on the shaping frame;

Fig. 13 is a vertical section through a furnace within which the dyed and shaped plastic sheet can be dried; and Fig. 14 is a diagrammatic view showing, in phantom lines, a plastic sheet in its normal form after it has been dyed in the flat, and in full lines, the form of the sheet after it has been distorted to the desired shape.

Referring now more particularly to the drawings, there is illustrated in Fig. 1 a windshield 10, produced in accordance with this invention, as it appears from the front seat of an automobile 11 in which the windshield is mounted. As explained above, this windshield is of conventional laminated construction in that it comprises two sheets of glass 12 and 13 and a non-brittle plastic interlayer 14 (Fig. 2). However, it departs from the ordinary construction by being specially shaped, and by having its plastic interlayer 14 provided with a glare-reducing area or band 15 which is colored or of a neutral shade and graduated in intensity from relatively dark at the top to practical extinction at the bottom, ending in an almost imperceptible cut-off line 16 between the colored or shaded and uncolored or unshaded areas.

The purpose of this is to provide, within the windshield, a glare-reducing area in which the color or neutral shade is relatively deep or intense at the top of the windshield, which is the area presenting the greatest glare, and tapers off gradually to a very low intensity, or to no shade or color at all, as it approaches the essential sighting area 17 of the windshield.

It will be noted from Fig. 1 that to the eye of an observer in the car the cut-off line 16 of the colored or neutral shaded area 15 appears as a straight, horizontal line. However, this is not actually the case, and I have discovered that in the specially curved, shaped and angled windshields now coming into common use in the modern streamlined and revolutionary designs of automobiles proposed for, and currently on, the market, a cut-off line in the colored area of the plastic interlayer that is actually straight and horizontally arranged will not appear to be so when laminated with the glass sheets and mounted in the automobile. Consequently, a colored area which actually has a straight cut-off line cannot be used. Instead, it becomes necessary to produce a colored or shaded area having a cut-off line which, regardless of its form when the plastic sheet is in the flat, is designed to appear as a straight, horizontal line when the colored plastic has been laminated into a windshield and the windshield mounted at an angle in an automobile.

Thus, in the windshield 10 of Figs. 1 to 3, and which is characteristic in shape, contour and angled position to the newer modern designs, it will be seen from Figs. 1 and 2 that, in order to obtain the the straight horizontal effect of cut-off line seen in Fig. 1, it has been necessary to provide a colored area having a cut-off line that is actually not straight at all, and so cannot be horizontally arranged. Instead, as best seen in Fig. 3, the cut-off line 13 is actually curved and is somewhat similar in contour to the curvature of the top lines of the glass sheets 12 and 13.

Now the coloring of a plastic sheet in a manner to produce a glare-reducing portion of this form that is properly graduated in color or shade from top to bottom, and which has an almost imperceptible cut-off line, presents a considerable problem.

Nevertheless, I have discovered a novel and yet relatively simple way of accomplishing it, which has the distinct advantage of permitting the plastic to be colored in the flat, with the flat colored plastic being subsequently shaped to give the desired form of colored area having a cut-off line of the correct curvature, trace or path.

In carrying out the invention the plastic sheets 18 may be dyed, for example, and for this purpose these sheets, which are preferably made somewhat larger than the interlayers 14 that are to be cut from them, are first mounted on flexible frames 19 (Figs. 4, 5 and 6). As shown, the frames 19 are generally rectangular in shape, being made up of four metal frame sections or rails 20, 21, 22 and 23 which are hinged or pivoted together at the four corners of the frame as shown at 24. The two side rails 20 and 21 may be of either rigid or flexible construction, while the bottom and top rails are flexible or bendable; and the top rail 23 is preferably longer than the other three rails and extends outwardly beyond the side rails 20 and 21 as shown at 25 to facilitate hanging of the frame during the dyeing, rinsing and drying of the plastic.

The plastic sheets 18 may be secured to the frames 19 in any desired manner, but I prefer to adhere them to the frame by first coating one side surface of each of the four rails 20 to 23 of the frame with a plastic solvent such as ethylene glycol mono-butyl ether and then smoothing the marginal portions of the plastic sheets into full contact with the frame entirely around their perimeters.

With a plastic sheet 18 mounted on the frame 19, a marginal portion thereof may be dyed in any desired manner, and there is illustrated in Fig. 4 one form of apparatus which is satisfactory for the purpose. The apparatus of Fig. 4 includes a framework 26 made up of a pair of horizontally arranged beams 27, supported on vertical floor beams 28 and connected together by bridging members 29 extending transversely thereof and also secured to the upper ends of opposed floor beams 28. The framework 26 substantially surrounds and acts to support certain of the elements of a loading section A, a dipping section B and first and second rinsing sections C and D respectively.

In order to permit the plastic sheets to be moved progressively through the various sections of the dyeing apparatus, rails 30 are mounted on the inner faces of the beams 27, which rails are adapted to support wheels 31 from which are suspended carriages 32 provided with hooks 33 adjacent their opposite ends.

Within the dipping section B the rails 30 are cut out as shown at 34, and normally positioned within this cut-out area is a dipping elevator 35 which carries rails 36 adapted to align with the rails 30 to close the cut-out portion 34 and provide a continuous track when the elevator is in raised or normal position. The elevator 35 is carried at the lower end of a piston rod 37 whose upper end is attached to a piston 38 mounted for reciprocal movement within an air or hydraulic cylinder 39.

Also mounted within the dipping section B, on a platform 40, and in vertical alignment with the elevator 35 is a vat or tank 41 containing a dye bath, which is preferably a solution of a suitable dye, for example 2% of 1:4 bis ortho-sulpho-para-tolyl aminoanthroquinone in a 50% by volume mixture of aqueous denatured alcohol.

To initiate the dyeing procedure, a flexible frame 19 to which has been secured a sheet of plastic 18 is hung from the hooks 33 of a carriage 32, positioned within the loading station A, by means of the extensions 25 on the top rail of the frame. The carriage 32, carrying the framed plastic is then moved to the right into the dipping section B at which time the wheels 31 of the carriage 32 will be riding upon the rails 36 of the elevator 35.

Air or liquid is then introduced into the upper end of the cylinder 39 through a pipe 42 to move the elevator 35 quickly downward into the broken line position in which the plastic sheet is just above the dye bath. The elevator 35 is then moved slowly downward to dip the lower marginal portion of the plastic sheet 18 into the bath in accordance with a predetermined time cycle that will produce the desired graduation in depth of color from the bottom of the dyed area to the top thereof. As soon as the plastic sheet has been immersed in the dye bath for the proper distance to give the width of dyed area desired, fluid is introduced into the lower end of the cylinder 39 through a pipe 43 to quickly raise the elevator 35 into the full line position and thus withdraw the plastic from the dye.

Since at this time the rails 36 on the elevator 35 are again in alignment with the rails 30, the carriage 35 can again be moved to the right to transfer the dyed plastic sheet 18 from the dipping section B to the first rinsing section C, Within the rinsing section C the dyed portion of the plastic sheet is immediately rinsed with a water-soluble alcohol-water mixture, such as one made up of 50% denatured ethanol and 50% by volume of distilled water, to remove the dyeing solution from the plastic and to arrest the dyeing action. It is important that this be done over the entire area of the dyed plastic as rapidly as possible and to this end there is provided within the rinsing section C a pair of carriages 44 and 45 mounted on wheels 46 which are adapted to run on a horizontal track 47. Each of the carriages 44 and 45 carry pairs of vertical pipes 48 provided with angled nozzles 49 and which are positioned to lie with one nozzle on either side of the plastic sheet 18 as the carriages are moved along the track 47.

The carriage 44 is attached by means of a link 50 to the upper run of a chain 51 trained about sprockets 52 carried by shafts 53, while the carriage 45 is attached to the lower run of the chain 51 by a link 54. A handle 55 is keyed to a shaft 56 which carries a gear 57 adapted to mesh with a corresponding gear on the shaft 53. By turning the handle 55 in one direction the chain 51 can be driven to cause the carriage 44 to move to the right and the carriage 45 to move to the left. This movement will cause the carriages 44 and 45 to move toward one another and rinsing solution fed to the pipes 48 will thus be sprayed on both sides of the dyed plastic from the ends thereof toward the center. When the carriages 44 and 45 meet, the handle 55 is moved in the opposite direction to move the carriages to their original position and thus complete the first spraying operation.

From the first rinsing section C the carriage 32 is moved into the second rinsing section D where the dyed portion of the plastic is finally rinsed with distilled water.

This can be accomplished by arranging water pipes 58 in position to lie on either side of the plastic sheet as it is moved into the section D and which pipes are provided with suitable openings through which water can be sprayed onto the plastic sheet.

Although the dyeing and rinsing procedure have been described above in connection with a single plastic sheet, it will be understood that the carriages 32 can be, and preferably are, made wide enough, and supplied with sufficient hooks 33 to accommodate a plurality of sheet carrying frames side by side on a single carriage, and that in this way a large number of plastic sheets can be processed at the same time.

After rinsing, the frames 19 carrying the dyed sheets are placed in a drying oven for a relatively short time (usually about 10 minutes) to remove the surplus rinsing materials from the plastic sheet.

This preliminary drying may be performed in a tunnel type drying kiln such as shown in Fig. 13 by mounting the frames 19 on a carriage 59 mounted on wheels 60 to run along tracks 61 on the floor 62 of the kiln 63. The kiln 63 is preferably heated, as by electrical resistance units 64 and air may be blown into the kiln, past the heating units 64 and toward the plastic sheets, through a pipe 65 to circulate the heat and speed up the drying action.

Following the preliminary drying of a dyed plastic sheet 18, it is then, while still adherently supported on the flexible frame 19, ready to be distorted into a form that will provide a dyed portion 15 of the proper shape and having a cut-off line 16 of the desired path. According to one preferred form of the invention this can be done on a shaping frame 66 such as is illustrated in Figs. 7 to 12.

As there shown, the frame 66 is of open rectangular shape, being made up of four angle iron sections 67, 68, 69 and 70, welded together at their meeting ends and provided with angularly extending bracing members 71. The top and bottom sections 67 and 68 of the frame 66 are provided on their outer faces, midway their ends with spaced, grooved slide members 72 within and between which is slidably received a flat bar 73 having a flange 74 at its upper end that extends rearwardly over the section 67. The flange 74 is provided with a threaded vertical opening 75 within which is received the threaded end of a bolt 76 whose lower end is rotatably mounted in an opening 77 in the lateral flange of the section 67 by means of a reduced portion 78 and collars 79 on the bolt 76. By this means the bar 73 may be moved vertically within the slides 72 by rotation of the bolt 76 for a purpose to be more clearly hereinafter set forth.

In order to mount the flexible frame 19 upon the shaping frame 66 and to support it thereon during distorting of the plastic sheet 18 carried thereby, there are screwed on the side sections 69 and 70 of the frame 66, adjacent their ends, rectangular stop blocks 80 which are provided with frame rail receiving grooves 81; while screwed to the top sections 67 and 68, adjacent their ends are substantially U-shaped frame rail retaining members 82 and 83 respectively. For the purpose of distorting the frame 19, when it is on the shaping frame 66, to reshape the plastic sheet, there are secured to the bar 73, adjacent its opposite ends, substantially L-shaped plates 84 having the top surface 85 of the horizontal leg of the L angled downwardly and inwardly to prevent slipping of the frame from the plate.

In distorting the plastic sheet 18 to the desired shape, the frame 19 containing the sheet is mounted on the shaping frame 66 while the bar 73 of the latter is in the lowered position shown in Fig. 7 and at which time the uppermost point of the top surface 85 of the horizontal leg of the L-shaped plate 84 is in substantial alignment with the bottoms of the grooves in the U-shaped retaining blocks 83. When properly mounted on the shaping frame 66, the bottom rail 22 of the frame 19 will rest in the grooves in the blocks 83 and its center portion will rest against the surface 85 of the lower plate 84 on the bar 73; the side rails 20 and 21 will lie in the grooves 81 of the stop or locator blocks 80; and the top rail will rest upon the face 85 of the upper plate 84 on the bar 73, all as shown in broken lines in Fig. 12.

Deformation of the flexible frame 19 and corresponding distorting or shaping of the plastic sheet carried thereby is then accomplished by rotating the bolt 76 to raise the bar 73 within the slides 72, causing the plates 84 to bend the rails 23 and 22 upwardly, until the frame 19 is in the position shown in full lines in Fig. 12. When this has been done it will be noted that the side rails 20 and 21 have been moved inwardly out of contact with the blocks 80; that the top and bottom rails 23 and 22 respectively have been bowed or arched; and that the bottom rail 22 has moved out of contact with the bottom of the groove in the blocks 83 while the top rail 23 has moved into contact with the top of the curved or angled grooves 86 in the blocks 82. Thus, the blocks 82 act as stops to control the distance that the bar 73 will be moved upwardly, and to also control the amount of distortion of the frame 19. For this reason, blocks should be used at 82 which have grooves of the angle or curve that it is desired to have the rail 23 assume at those points. Or, if desired, the blocks 82 may be provided with slots for the machine screws 87 which will permit the grooves 86 to be adjusted to the desired angle.

The feature of hinging or pivoting the rails of the frame 19 at the four corners is an important one in insuring proper distorting or shaping of the plastic sheet 18 because, by this means the top and bottom rails 23 and 22 are permitted to bend uniformly throughout their entire length as the frame is distorted, whereas if the rails were rigidly secured together at the corners of the frame the portions of the top and bottom rails adjacent the corners would be prevented from bending. Another feature of the flexible frame 19 is the angled braces 88 which are welded to the side rails 20 and 21 as at 89. The upper ends of these braces 88 are adapted to engage the top rail 23 and to prevent this rail from sagging when the frame 19 is hung by the ends 25 of the rail 23 during dipping, rinsing and drying of the plastic sheet. Consequently, it insures that the frame 19 will retain its rectangular shape, and be undistorted, during these times when it is important that that be done. At the same time, because the upper ends of the braces 88 are not secured to the rail 23 in any way, this top rail is free to move away therefrom during distortion of the frame as clearly shown in broken lines in Fig. 6.

It will be seen from the full line showing in Fig. 12 that after distortion or bending of the frame 19 in the manner described above, the plastic sheet 18 will be so shaped that, when turned bottom side up, it will exhibit a dyed area 15 of the shape and form shown in the interlayer 14 of Fig. 3, and having a cut-off line 16 following the trace or path required in the interlayer of that figure for the particular shape, contour and angle of windshield shown in Figs. 1 and 2 to give a straight, horizontal cut-off line when mounted at an angle in an automobile. This is shown diagrammatically, but somewhat more clearly in Fig. 14 where the broken lines show the plastic sheet 18 after it has been dyed in the flat, and the full lines show the same sheet after it has been stretched to the required shape on the shaping frame 66.

Following the distorting of the plastic sheet 18 to its new shape, the shaping frame 66 with the frame 19 still in its distorted position and carrying the reshaped plastic, is placed on the carriage 59 in the drying oven or kiln 63 where it is dried at elevated temperatures (preferably around 155° F.), for a sufficient length of time to remove all solvents absorbed from the dye bath and all absorbed moisture (not more than .5% must be permitted to remain).

The distortion or strain in the plastic during reshaping may cause some wrinkling of the distorted sheet. However, since the plastic shrinks endwise during drying these wrinkles will pull out in the drying oven.

After drying, the plastic is cooled down to room temperature while still held in its distorted shape, and this acts to "freeze" the strains in the sheet. It may then be removed from the frame 19 and it will be found that it will retain the shape into which it has been distorted. Nevertheless, because the material of the sheet 18 has "elastic memory," that is, an inherent tendency to return to its natural state after deformation, there may be a slight "spring back" when it is first removed from the frame. However, this is usually so slight as to be unobjectionable or, it can be compensated for by over distorting if desired.

Although the distorted, dyed and cooled plastic will quickly resume its original shape at elevated temperatures, and ultimately even at room temperature, I have found that, after the first spring back, it will maintain its strained or distorted shape for several days at ordinary room temperatures, and this is sufficient for the present purpose.

Although the operation of the flexible frame 19, and the shaping frame 66, have been described in connection with the shaping or distorting of a plastic sheet that has been dyed on the frame, it will be understood that this apparatus will be equally effective when used in connection with a plastic sheet that has been colored or shaded while on the frame by methods other than dyeing; and in connection with plastic sheeting that has been colored before it is mounted on the flexible frame 19.

For example, plastic sheeting can be dyed or otherwise colored or shaded, such as by printing, to provide a suitable non-glare area, while in strip form; and the strip then cut up into sections 18 of the proper size to attach to the frame 19 after coloring and prior to distortion on the shaping frame 66.

Following removal of the plastic sheet 18 from the frame 19, it is trimmed to size to form an interlayer 14, thus removing the marginal portions that have been adhered to the frame. It is then assembled together with two pieces of glass as shown in Fig. 3 to form a glass-plastic sandwich which is then laminated under heat and pressure to form a composite, unitary structure which can be used as a windshield 10 and which, when mounted in an automobile in the manner shown in Figs. 1 and 2, will exhibit a dyed non-glare area 15 having a straight, horizontal cut-off line.

Once the interlayer 14 has been laminated between two sheets of glass it will be permanently held in its strained shape and no ill effects will be had. However, according to a somewhat modified form of the invention, an interlayer of the same shape and having the same colored area as shown at 14, but which is unstrained, can be produced. This is accomplished by pattern cutting the plastic to the shape shown at 14, then mounting it on a flexible frame which has been constructed to fit the pattern cut shape, next distorting the frame to reshape the plastic into rectangular shape, heating the reshaped plastic to remove wrinkles, dyeing or otherwise coloring the plastic while still in the rectangular shape "in the flat," and finally releasing the distorted frame to permit it and the colored plastic to assume their original shape (as shown at 14) and then drying in the oven before removing the plastic from the frame.

Although the present invention has been described in connection with a windshield of particular shape and that is set at a particular angle in the automobile, it will be obvious that dyed plastic interlayers may be produced by the teachings of this invention to fit into any type of curved and angled windshield and to still exhibit a colored or neutrally shaded glare-reducing area having a straight, horizontal cut-off line.

In fact, it is to be understood that the forms of the invention herewith shown and described are to be taken as illustrative embodiments only of the same, and that various changes may be resorted to without departing from the spirit of the invention or the scope of the subjoined claims.

I claim:

1. In apparatus for distorting a plastic sheet to a desired shape, a flexible open frame comprising a plurality of rails arranged in end to end relation and upon which said sheet is mounted, means for hinging the ends of adjacent rails together, a rigid shaping frame, means on said shaping frame for supporting said flexible frame, and means in addition to said supporting means on said shaping frame for distorting said flexible frame while the same is on said shaping frame to distort said plastic sheet to the desired shape.

2. In apparatus for treating a plastic sheet prior to laminating, a substantially rectangular frame comprising a pair of side rails, a flexible bottom rail hinged to said side rails at two corners of said frame, a flexible top rail hinged to said side rails at two other corners of said frame and extending outwardly beyond said side rails, and an angled brace member running between one of said side rails and said top rail, said brace member being secured to said side rail and being normally free from but in abutting relation to said top rail to limit bending movement of said top rail in one direction.

3. In apparatus for distorting a plastic sheet to a desired shape, a flexible open frame comprising a plurality of rails at least some of which are flexible hinged together at the corners of said frame and upon which said sheet is mounted, a rigid shaping frame, means on said shaping frame for supporting said flexible frame thereon, means carried by said shaping frame for distorting said flexible frame while on said shaping frame to stretch the plastic to the desired shape, and stop means on said shaping frame engageable with one of the rails of said flexible frame for limiting the extent to which said frame can be distorted.

4. In apparatus for distorting a plastic sheet to a desired shape, a flexible frame on which the sheet is mounted, a rigid shaping frame, means on said shaping frame for supporting said flexible frame thereon, a member slidable on said shaping frame and having a portion thereof engaging said flexible frame while it is on said shaping frame, and means for sliding said member to distort said flexible frame and distort said plastic sheet to the desired shape.

5. In apparatus for distorting a plastic sheet to a desired shape, a substantially rectangular open frame comprising a pair of side rails and bendable top and bottom rails all hinged together at the corners of the frame and a pair of angled brace members each secured to one of said side rails and extending from said side rail to said top rail, a rigid shaping frame, means on said shaping frame for supporting said flexible frame thereon, a bar slidable on said shaping frame and having portions engaging the top and bottom rails of the flexible frame while said frame is on said shaping frame, means for sliding said bar to bend said top and bottom rails and stretch said plastic sheet to the desired shape, and means carried by said shaping frame for limiting the extent to which said rails can be bent.

References Cited in the file of this patent

UNITED STATES PATENTS

| | | |
|---|---|---|
| 487,894 | Shields | Dec. 13, 1892 |
| 944,422 | Falk | Dec. 22, 1909 |
| 1,897,893 | Evans | Feb. 14, 1933 |
| 2,062,567 | Forbes | Dec. 1, 1936 |
| 2,189,006 | Hutchinson | Feb. 6, 1940 |
| 2,515,830 | Mahler | July 18, 1950 |